United States Patent [19]
Hudson

[11] Patent Number: 5,224,110
[45] Date of Patent: Jun. 29, 1993

[54] TUNABLE LASER FREQUENCY STABILIZING SYSTEM

[75] Inventor: David F. Hudson, Clarksburg, Md.

[73] Assignee: The United States of America as represented by the Secretary of the Navy, Washington, D.C.

[21] Appl. No.: 888,996

[22] Filed: May 27, 1992

[51] Int. Cl.$^5$ ................................................ H01S 3/13
[52] U.S. Cl. ........................................ 372/32; 372/31; 372/33; 372/37; 372/38; 372/23; 372/39; 372/34; 372/20; 372/92
[58] Field of Search .................. 372/29, 32, 31, 33, 372/37, 39, 92, 23, 20, 34, 38

[56] References Cited

U.S. PATENT DOCUMENTS

| | | | |
|---|---|---|---|
| 3,711,786 | 1/1973 | Vauther et al. | 372/32 |
| 3,899,748 | 8/1975 | Bodlaj | 372/32 |
| 3,921,099 | 11/1975 | Abrams et al. | 372/32 |
| 4,592,058 | 5/1986 | Mongeon et al. | 372/32 |

Primary Examiner—Léon Scott, Jr.
Attorney, Agent, or Firm—John D. Lewis; Jacob Shuster

[57] ABSTRACT

Laser emissions are stabilized at a plurality of frequencies by passage through an absorbing medium pumped by light, merged therewith, to an excited energy state corresponding to pumping light frequencies. Error signals are generated in response to detection of intensity of radiation exiting the absorbing medium which deviates from that of the laser emissions at the stabilizing frequencies to correctively adjust resonant cavity length of the laser generator being frequency stabilized.

13 Claims, 2 Drawing Sheets

TUNABLE LASER FREQUENCY STABILIZING SYSTEM

BACKGROUND OF THE INVENTION

This invention relates generally to frequency control of laser emitted radiation.

A generally known method for stabilization of laser frequency, with which the present invention is associated, involves the Stark effect wherein an electric field applied to a radiation absorbing medium acts to change its atomic or molecular energy state reflected by corresponding spectral and absorption lines. Heretofore, a small fraction of a laser emission was directed through a body of the absorbing medium selected because of maximum absorption corresponding to the desired frequency at which the laser is to be stabilized. An error signal was generated by phase comparison of oscillatory modulations of the DC electric field, establishing the maximum absorption state of the absorbing medium, in order to correct deviation from the stabilization frequency by adjustment of the resonator cavity length of the laser generator through which laser frequency is determined.

Although the foregoing method of frequency stabilization is precise, the Stark effect absorption of laser radiation by the absorbing medium was typically limited to one or a few absorption lines thereby limiting the number of corresponding frequencies capable of being stabilized by a single absorption cell. The degree of variation in absorption coefficients furthermore created problems in connection with any absorbing medium having more than one usable absorption line.

It is therefore an important object of the present invention to provide a radiation absorption cell employing the Stark effect to stabilize operation of a laser with respect to a plurality of emission frequencies in a precise and rapid manner without the problems and complexities heretofore experienced.

A further object of the invention is to provide a single Stark effect absorption cell through which a corrective adjustment process may be effected to stabilize a plurality of different emission frequencies between which laser operation may be rapidly switched, without clutter or interference.

SUMMARY OF THE INVENTION

In accordance with the present invention, a single radiation absorption cell is utilized to stabilize a plurality of operational frequencies of a frequency tuned laser generator with precision and in a rapid manner by corrective adjustment of its resonator cavity length, utilizing Stark effect absorption transitions between excited states of a selected absorbing medium within the cell. Two excited states are optically coupled and adjusted by the Stark effect to exhibit an energy difference substantially equal to the energies corresponding to the laser emissions at the frequencies to be stabilized. The absorbing medium is optically pumped to the lower of such two excited states by pumping light at one or more frequencies. The pumping light is merged with the laser emission to be frequency stabilized through a dichroic mirror directing the light into the cell.

The merged light enters the cell through an entry window. Such window seals a chamber in the cell containing the absorbing medium, such as potassium vapor, within which the laser emission at the stabilized frequency is absorbed to a maximum extent. The unabsorbed radiation exits the cell through a chamber sealing exit window and is directed into a filter which blocks passage of the pumping light so as to confine it to its optical pumping function. The intensity of any unabsorbed laser light at a frequency deviating from the stabilized frequency is detected and phase compared to produce an error signal for corrective adjustment of laser generator operation as aforementioned.

In order to support establishment of the two excited states of the absorbing medium for the absorption transition phases of the process, the vapor pressure of the absorbing medium within the cell is maintained by a heating mantel. Heating elements are furthermore provided to maintain the entry and exit windows of the cell at a slightly higher temperature to prevent clouding condensation of the absorbing medium on the internal faces of the windows.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 2:
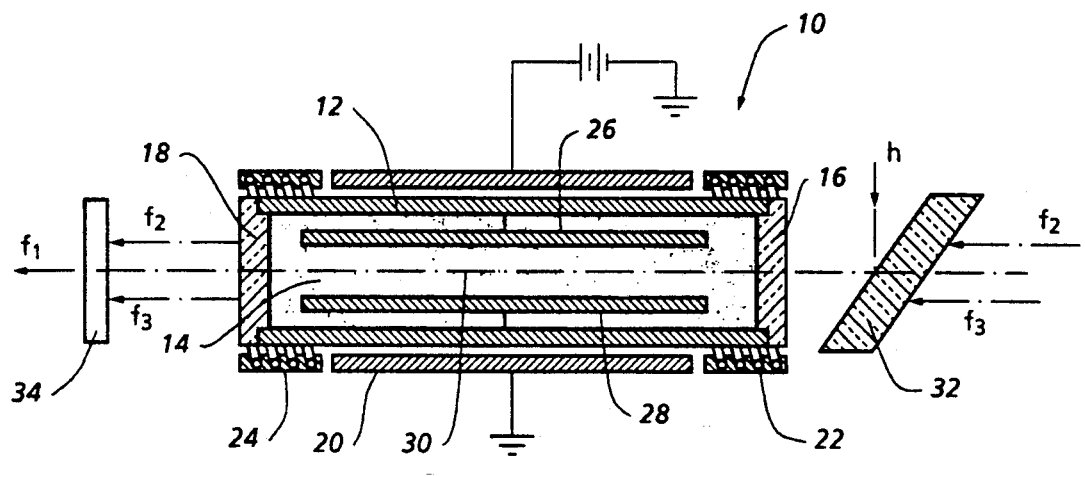
FIG. 2 is a side section view of the absorption call associated with one embodiment of the present invention.

Referring now to the drawing in detail, FIG. 2 illustrates a tunable absorption cell in accordance with the invention, generally referred to by reference numeral 10. The cell 10 encloses within its elongated housing 12 a chamber occupied by an absorbing medium 14 and sealed by vacuum tight windows 16 and 18 at opposite ends of the housing. A heating mantel 20 surrounds the chamber housing 12 through which the required vapor pressure for the absorbing medium 14 is established by injection of heat. Separate annular heating elements 22 and 24 are mounted adjacent the opposite axial ends of the housing 12 to maintain the windows 16 and 18 at a slightly higher temperature and thereby avoid transparency reducing condensation of the medium 14 on the internal faces of the windows.

A pair of electrodes 26 and 28 are positioned within the housing chamber of cell 10 as shown in FIG. 2. The electrodes extend longitudinally in parallel spaced relation to a longitudinal axis 30 of the chamber to establish a transversely extending electric field to tune the energy difference between two excited states of the medium 14 so as to be equal to the frequency of the laser emissions to be stabilized as will be explained hereinafter.

Figure 1:
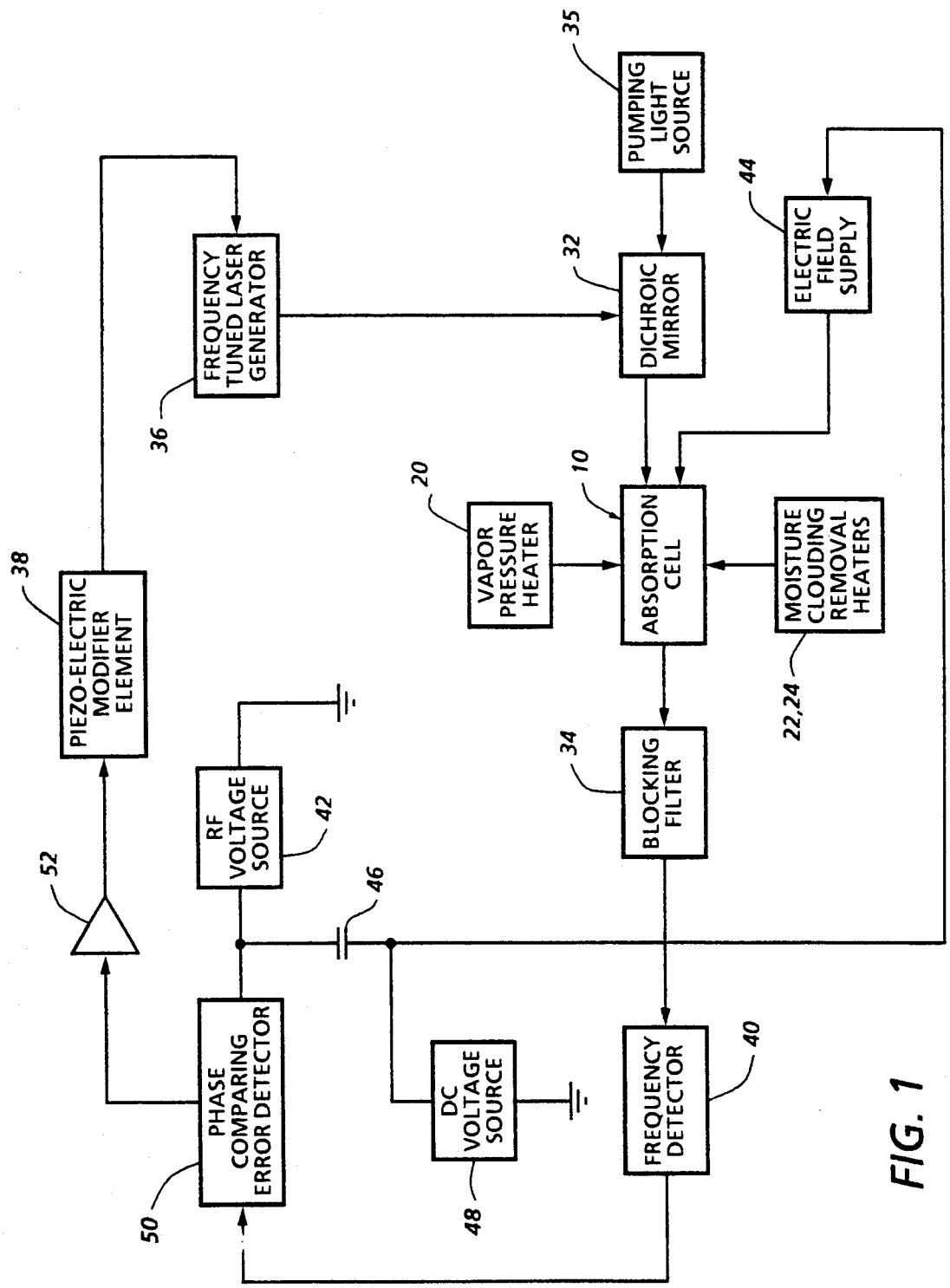
FIG. 1 is a schematic block diagram of the laser frequency stabilizing system associated with the present invention.

According to one embodiment of the invention, the absorbing medium 14 is potassium vapor optically pumped to a lower 8 P level corresponding to one of two excited states within a continuous tuning range in excess of 600 GHz. The other excited energy state is the $8d$ level of the potassium vapor medium 14 attained by partial absorption of the radiation to be stabilized. The absorbing medium is optically excited to the lower of such two states by light entering window 16 at frequencies f2 and f3 as shown in FIG. 1, such light passing through a dichroic mirror 32. Laser light to be stabilized at a desired frequency f1 also enters the cell chamber through window 16 from mirror 32, as shown, and passes through a blocking filter 34 after exiting window 18.

The light at the two frequencies f2 and f3 from light source 35, is blocked by filter 34 to thereby limit its function to optical pumping of the medium 14 to its excited free atomic state as diagrammed in FIG. 2. The laser light to be stabilized at the desired frequency f1, on the other hand, is derived from a $CO_2$ type laser generator 36 that is frequency tuned by modification of its optical resonance cavity length through a piezo-electric modifier element 38. The non-absorbed laser light-transmitted through cell 10 after being intercepted by blocking filter 34, is received by detector 40 to monitor its intensity. When the frequency f1 of the transmitted laser light corresponds to the frequency difference between the two excited states of the absorbing medium 14 in cell 10, the light intensity of the non-absorbed radiation is at a minimum. The intensity amplitude of such radiation is varied by applying a small oscillatory voltage to the electrodes 26 and 28 from a RF volt source 42 through an electric field supply 44 to which source 42 is coupled by capacitor 46 in parallel with the DC voltage source 48 as diagrammed in FIG. 2.

When the laser light exiting from the absorption cell 10 passes through filter 34 and is sensed by detector 40 as aforementioned, its intensity amplitude is compared as to phase with that of the oscillation of RF voltage source 42 by means of a phase sensitive detector 50 in order to produce an error signal when deviation from the stabilized frequency f1 occurs. Such error signal is fed to a high voltage amplifier 52 from which a correction signal is applied to the piezoelectric element 38 for correcting the frequency of the laser emission from laser generator 36 by modifying the length of its optical resonator cavity.

Figure 3:
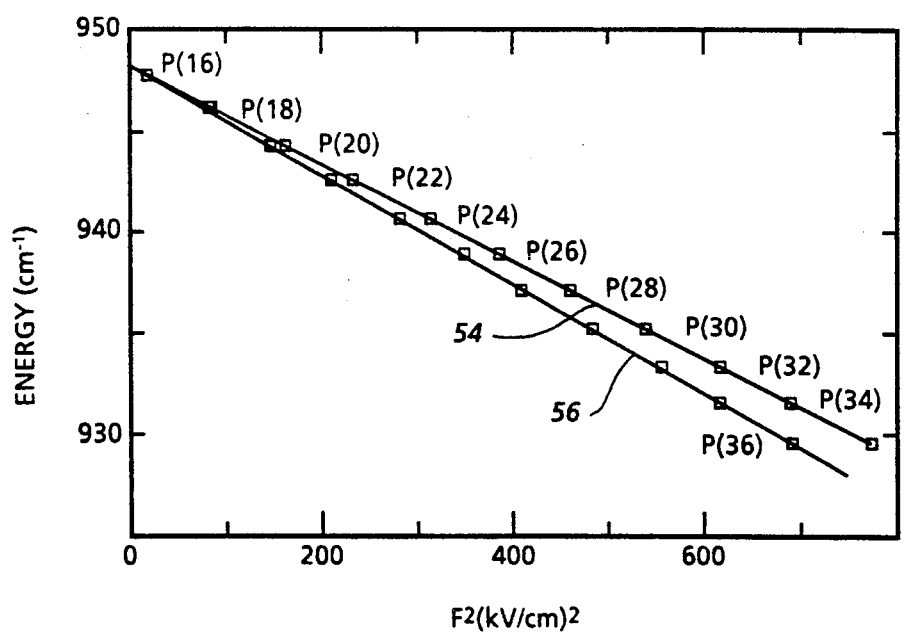
FIG. 3 is a prior art graphical illustration exhibiting certain characteristics of the absorbing medium utilized in the cell depicted in FIG. 2.

Electric fields such as those established between electrodes 26 and 28 connected to the DC voltage source 48 have already been investigated by Gelbwachs et al. as set forth in an article entitled "Stark Tuning of the Atomic Vapor Quantum Counter" published February, 1980 in the I.E.E.E. Journal, volume 14, pages 137–142. As graphically depicted in FIG. 3 by curves 54 and 56, the 8p and 8d levels of such electrical fields are separated as a function of the voltage applied by the supply 44. As graphically shown, modest field strengths produce large quadratic Stark effect shifts in the excited states of the absorbing medium, as the 7th power of the principle quantum number (n) reflected by the data points on curves 54 and 56, to obtain exact resonance with 11 of the most intense frequency lines of a 10 micrometer P band of the $CO_2$ laser generator 36. It will therefore be apparent that the single absorbing cell 10, in the described arrangement as diagrammed in FIGS. 1 and 2, is effective to precisely stabilize operation at several different frequencies during absorption transitions with essentially the same absorption coefficient thereby avoiding the problems of varying absorption coefficient strengths. The stabilization process is furthermore accomplished very rapidly, probably on the order of milliseconds time.

Numerous other modifications and variations of the present invention are possible in light of the foregoing teachings. It is therefore to be understood that within the scope of the appended claims the invention may be practiced otherwise than as specifically described.

I claim:

1. In combination with a laser generator from which radiation is emitted and means for stabilizing operation of the laser generator by adjustment of resonance cavity length therein in response to an error signal, including a cell enclosing an absorbing medium through which the emitted radiation is transmitted, tuning means for establishing an electric field within the cell controlling absorption of the emitted radiation by the absorbing medium and phase sensitive means responsive to exit of non-absorbed radiation from the cell for generating said error signal; the improvement comprising means for optically pumping the absorbing medium to a lower of two excited states having an energy differential substantially equal to differences between energies of the radiation emitted from the laser generator at a plurality of radiation frequencies and detector means responsive to detection of minimum intensity of the non-absorbed radiation exiting from the cell for controlling said generation of the error signal by the phase sensitive means, said tuning means being operative to select one of the plurality of the radiation frequencies to be stabilized during operation of the laser generator.

2. The improvement as defined in claim 1 wherein said optical pumping means includes: a source of pumping light at frequencies respectively corresponding to energy of the lower of the excited states of the absorbing medium and dichroic mirror means directing the pumping light into the cell for merger with the emitted radiation from the laser generator.

3. The improvement as defined in claim 2 including filter means for blocking the pumping light exiting from the cell.

4. The improvement as defined in claim 3 including heating means for maintaining the absorbing medium within the cell under a predetermined vapor pressure.

5. The improvement as defined in claim 4 wherein the cell includes: a housing enclosing the absorbing medium, window means for sealing the absorbing medium within the housing while transmitting the emitted radiation from the laser generator merged with the pumping light and additional heating means for maintaining the window means at an elevated temperature preventing condensation of the absorbing medium thereon within the cell.

6. The improvement as defined in claim 1 including heating means for maintaining the absorbing medium within the cell under a predetermined vapor pressure.

7. The improvement as defined in claim 6 wherein the cell includes a housing enclosing the absorbing medium, window means for sealing the absorbing medium within the housing while transmitting the emitted radiation from the laser generator merged with the pumping light and additional heating means for maintaining the window means at an elevated temperature preventing condensation of the absorbing medium thereon within the cell.

8. In combination with a laser generator from which radiation is emitted, and means for stabilizing operation of the laser generator by adjustment of resonance cavity length therein in response to an error signal and a cell enclosing an absorbing medium through which the emitted radiation is transmitted, the improvement comprising: means for optically pumping the absorbing medium to a lower of two excited states having an energy differential substantially equal to differences between energies of the radiation emitted from the laser generator at a plurality of radiation frequencies and heating means for maintaining the absorbing medium within the cell under a predetermined vapor pressure.

9. The improvement as defined in claim 8 wherein the cell includes a housing enclosing the absorbing medium, window means for sealing the absorbing medium within the housing while transmitting the emitted radiation and heating means for maintaining the window means at an elevated temperature preventing condensation of the absorbing medium thereon within the cell.

10. In combination with a laser generator from which radiation is emitted, means for stabilizing operation of the laser generator by adjustment of resonance cavity length therein in response to an error signal, a cell enclosing an absorbing medium through which the emitted radiation is transmitted, tuning means for establishing an electric field within the cell controlling absorption of the emitted radiation by the absorbing medium and phase sensitive means responsive to exit of non-absorbed radiation from the cell for generating said error signal; the improvement comprising: a source of light, means for directing said light into the cell at a frequency corresponding to a lower of two excited states of the absorbing medium having an energy differential substantially equal to differences between energies of the radiation emitted from the laser generator and filter means for blocking the light exiting from the cell at said frequency thereof.

11. The improvement as defined in claim 10 including means detecting deviations in intensity of the non-absorbed radiation from a minimum level at one of a plurality of radiation frequencies to be stabilized for rendering the phase sensitive means operative to generate said error signal.

12. In a system having a method for frequency stabilization of laser emissions, wherein maximum absorption of said emissions at a stabilized frequency occurs within an absorbing medium subjected to an electric field and non-absorbed emission passing through said absorbing medium is detected while laser frequency tuning is effected by resonator cavity length adjustment as a phase related function of intensity of the non-absorbed emission, the improvement comprising the steps of: selecting the absorbing medium which exhibits two optically coupled excited states having an energy differential corresponding to the laser emissions at stabilized frequencies; optically pumping the absorbing medium, while positioned within said electric field, to a lower one of said two excited states; and selectively tuning the electric field to adjust energy levels of the absorbing medium establishing said energy differential.

13. The improvement as defined in claim 12 wherein said step of optically pumping the absorbing medium includes: generating light at a frequency corresponding to said lower one of the two excited states of the absorbing medium; and merging said light with the laser emissions directed into the absorbing medium.

* * * * *